Figures 1, 2:
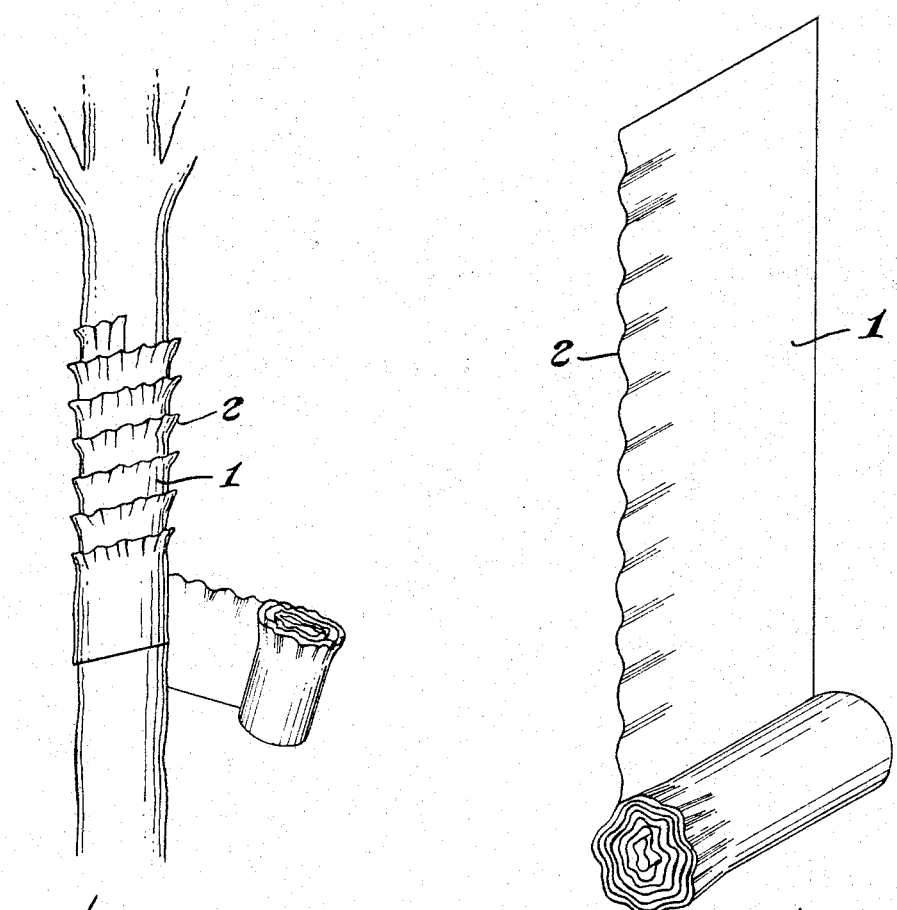

Aug. 1, 1967  T. S. MANAK  3,333,361
PLASTIC TREE BAND
Filed March 5, 1965

INVENTOR.
Thomas S. Manak
BY Jerome Rudy
ATTORNEY

United States Patent Office 3,333,361
Patented Aug. 1, 1967

3,333,361
PLASTIC TREE BAND
Thomas S. Manak, Cleveland, Ohio, assignor to The Dow Chemical Company, Midland, Mich., a corporation of Delaware
Filed Mar. 5, 1965, Ser. No. 437,411
2 Claims. (Cl. 47—58)

This invention relates to plastic sheets adapted to be wrapped around tree trunks and branches, and a method of applying such wrappings, to afford protection thereto against weather conditions, animals, insects and the like which frequently attack trees causing damage thereto, many times resulting in the death of the tree.

The present invention comprises a plastic film band having a crimped edge.

Suitable plastic materials of which the tree band may be composed include polyethylene, polypropylene, polyester, saran and the like. Polyethylene is a preferred material.

The plastic tree bands used in accordance with the present invention are suitably thin plastic films ranging in thickness from about 1 to 10 mils and ranging in width from about 4 to 8 inches. The film may be of any length to fit the circumference of the individual tree and the length of the part to be protected. The film band can be readily applied to the tree and fastened to the tree by any suitable means, such as roping, stapling and the like.

The essential features of the present invention consist in providing a crimp in the upper edge of the film band and spirally winding the band around the tree trunk or branch in a top to bottom direction with the crimped portions of the spirals overlapping the uncrimped portions, whereby the crimped edges serve to capture and retain moisture. The retained moisture encourages and nurtures healing or new growth when the plastic film bands are wrapped around tree trunks whose barks have been damaged by any of a variety of causes such as wind, frost and animal gnaws.

Referring to the drawings, FIGURE 1 is a side elevation illustrating a plastic film band having a crimped edge constructed in accordance with the present invention being wound around a tree trunk. FIGURE 2 is a perspective view showing a roll of the plastic film prior to its application to the tree.

Referring in detail to the drawing, a plastic film band 1 of suitable thickness having a series of crimps 2 along one edge is spirally wound onto a tree trunk in a top to bottom direction so that the crimped edges of the film band overlap the uncrimped portions of the film and extend outwardly from the tree trunk. The film wrapped in this manner fits the contours of the tree snugly. The ends of the plastic band may be secured to the tree by stapling or any other suitable fastening means.

The plastic film band of the character described and shown in the drawing may be easily and quickly applied to the tree and removed therefrom as desired and will not interfere with the growth of the tree while affording protection thereto.

What is claimed is:
1. A method for protecting a tree member which comprises winding a plastic film band having a crimped upper edge and an uncrimped lower edge along its length around the tree member in a top to bottom direction with the crimped edge portions of the film overlapping the uncrimped edge portions of the film and extending outwardly from the tree member.
2. The method of claim 1 wherein the plastic film is comprised of polyethylene.

References Cited

UNITED STATES PATENTS

| | | | |
|---|---|---|---|
| 197,363 | 11/1877 | Headington | 47—23 X |
| 426,106 | 4/1890 | Brooks | 47—23 |
| 772,429 | 10/1904 | Nioa | 43—108 |
| 2,047,958 | 7/1936 | Frees | 47—23 |
| 2,502,772 | 4/1950 | Winstead | 161—126 X |

OTHER REFERENCES

The New York Times, June 29, 1958, p. x19.
The Washington Post, Jan. 4, 1959, p. C8.

ABRAHAM G. STONE, *Primary Examiner.*
ANTONIO F. GUIDA, *Examiner.*
P. A. RAZZANO, *Assistant Examiner.*